(12) United States Patent
Hong (10) Patent No.: US 9,405,895 B2
(45) Date of Patent: Aug. 2, 2016

(54) METHOD OF GENERATING AUTHENTICATION PATTERNS AND AUTHENTICATING SYSTEM EMPLOYING THE SAME

(71) Applicant: SAMSUNG DISPLAY CO., LTD., Yongin, Gyeonggi-Do (KR)

(72) Inventor: Jun-Woo Hong, Cheonan-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 25 days.

(21) Appl. No.: 14/507,306

(22) Filed: Oct. 6, 2014

(65) Prior Publication Data

US 2015/0121513 A1    Apr. 30, 2015

(30) Foreign Application Priority Data

Oct. 31, 2013  (KR) .......................... 10-2013-0130913

(51) Int. Cl.
| | |
|---|---|
| G06F 21/34 | (2013.01) |
| G06F 21/35 | (2013.01) |
| G06F 21/36 | (2013.01) |
| G06F 21/44 | (2013.01) |
| H04W 12/06 | (2009.01) |
| H04W 12/08 | (2009.01) |

(52) U.S. Cl.
CPC ................. *G06F 21/34* (2013.01); *G06F 21/35* (2013.01); *G06F 21/36* (2013.01); *G06F 21/44* (2013.01); *H04W 12/06* (2013.01); *H04W 12/08* (2013.01)

(58) Field of Classification Search
CPC ......... G06F 21/34; G06F 21/25; G06F 21/36; G06F 21/30; G06F 21/44; G06F 21/35; H04L 63/0876; H04W 12/06; H04W 12/08
See application file for complete search history.

(56) References Cited

U.S. PATENT DOCUMENTS

| | | | | |
|---|---|---|---|---|
| 6,362,802 B1* | 3/2002 | Fujiwara | ............... | G06T 1/0007 345/87 |
| 7,667,871 B1* | 2/2010 | Roskind | .............. | G06F 21/6254 235/386 |
| 2001/0019434 A1* | 9/2001 | Popovich | ................. | G02B 5/32 359/15 |
| 2002/0085159 A1* | 7/2002 | Oh | ........................ | G02F 1/1345 349/149 |
| 2005/0109846 A1* | 5/2005 | Lubow | ............. | G06K 19/06028 235/462.01 |

(Continued)

FOREIGN PATENT DOCUMENTS

| | | |
|---|---|---|
| JP | 2013-041099 | 2/2013 |
| KR | 10-2009-0048398 A | 5/2009 |
| KR | 10-2012-0123824 A | 11/2012 |

*Primary Examiner* — Ali Abyaneh
*Assistant Examiner* — Carlos M De Jesus Lassala
(74) *Attorney, Agent, or Firm* — Lee & Morse, P.C.

(57) ABSTRACT

An authenticating system includes an authenticating device, a background display device, a sensing device, and an authentication pattern checking device. The authenticating device displays a first display pattern on a transparent display panel including a transmissivity pattern. The transmissivity pattern includes a plurality of regions with different transmissivities. The background display device displays a second display pattern on a display panel to overlap the transparent display panel. The sensing device generates a sensing pattern by sensing an authentication pattern generated based on the transmissivity pattern, the first display pattern, and the second display pattern. The authentication pattern checking device performs authentication by checking whether the sensing pattern is consistent with an authentication reference pattern.

19 Claims, 7 Drawing Sheets

(56) References Cited

U.S. PATENT DOCUMENTS

| | | | |
|---|---|---|---|
| 2006/0001781 A1* | 1/2006 | Uehara | G09G 5/003 348/790 |
| 2007/0182681 A1* | 8/2007 | Kim | G06F 3/147 345/87 |
| 2010/0302194 A1 | 12/2010 | Park et al. | |
| 2011/0187655 A1* | 8/2011 | Min | G06F 1/1643 345/173 |
| 2013/0057684 A1* | 3/2013 | Iwai | G06Q 10/10 348/143 |
| 2013/0083040 A1* | 4/2013 | Prociw | G09G 3/3208 345/502 |

\* cited by examiner

METHOD OF GENERATING AUTHENTICATION PATTERNS AND AUTHENTICATING SYSTEM EMPLOYING THE SAME

CROSS-REFERENCE TO RELATED APPLICATION

Korean Patent Application No. 10-2013-0130913, filed on Oct. 31, 2013, and entitled: "METHOD OF GENERATING AUTHENTICATION PATTERNS AND AUTHENTICATING SYSTEM EMPLOYING THE SAME," is incorporated by reference herein in its entirety.

BACKGROUND

1. Field

One or more embodiments described herein relate a method of generating authentication patterns and an authenticating system employing the same.

2. Description of the Related Art

Security continues to be a focus of system designers. For example, when a user tries to access a system or a place that requires security, an authenticating system may determine whether the user has access authority. To perform this operation, a sensing device has been proposed that senses an authentication pattern from an authenticating device carried by a user. An authentication pattern checking device then checks whether the authentication pattern is consistent (i.e., matches) a reference pattern.

However, authenticating systems of this type have proven to have drawbacks. For example, because the authentication pattern is stored in the authenticating device, the authentication pattern may be forged when the authenticating device is hacked by a hacker (e.g., the authentication pattern may be leaked to a hacker and used for nefarious purposes).

SUMMARY

In accordance with one embodiment, an authenticating system includes an authenticating device configured to display a first display pattern on a transparent display panel including a transmissivity pattern, the transmissivity pattern being formed by setting transmissivity of respective regions differently on the transparent display panel; a background display device configured to display a second display pattern on a display panel, the display panel arranged to overlap the transparent display panel; a sensing device configured to generate a sensing pattern by sensing an authentication pattern generated based on the transmissivity pattern, the first display pattern, and the second display pattern; and an authentication pattern checking device configured to perform authentication by checking whether the sensing pattern is consistent with an authentication reference pattern.

The authentication pattern may include at least one of a bar code pattern, a quick response code pattern, a character pattern, a number pattern, a figure pattern, or an image pattern.

The authentication reference pattern may be preset based on the transmissivity pattern, the first display pattern, and the second display pattern, and the authentication reference pattern may be stored in the authentication pattern checking device. The authentication reference pattern may be generated by adjusting at least one of a gray-level of the first display pattern or a gray-level of the second display pattern with respect to the transmissivity pattern.

Interactions among the authenticating device, the background display device, the sensing device, and the authentication pattern checking device may occur when the transparent display panel of the authenticating device is moved over the display panel of the background display device. The authentication pattern checking device may provide the authenticating device with first data related to the authentication reference pattern, and the authenticating device may display the first display pattern corresponding to the first data on the transparent display panel.

The authenticating device may include a display unit including the transparent display panel; a receiving unit configured to receive the first data from the authentication pattern checking device; and a central processing unit configured to process the first data to output the first display pattern to the display unit.

The authentication pattern checking device may provide the authenticating device with an authentication start signal, and the authenticating device may display the first display pattern related to the authentication reference pattern on the transparent display panel in response to the authentication start signal. The authenticating device may include a display unit including the transparent display panel; a receiving unit configured to receive the authentication start signal from the authentication pattern checking device; a memory unit configured to store first data corresponding to the first display pattern; and a central processing unit configured to process the first data to output the first display pattern to the display unit.

The authentication pattern checking device may provide the background display device with second data related to the authentication reference pattern, and the background display device may display the second display pattern corresponding to the second data on the display panel.

The authentication pattern checking device may provide the background display device with an authentication start signal, and the background display device may display the second display pattern related to the authentication reference pattern on the display panel. The authenticating device and the background display device may be in different electronic devices. The authenticating device and the background display device may be in a same electronic device.

In accordance with another embodiment, a method of generating authentication patterns includes displaying a first display pattern on a transparent display panel including a transmissivity pattern, the transmissivity pattern formed by setting transmissivity of respective regions differently on the transparent display panel; displaying a second display pattern on a display panel arranged to overlap the transparent display panel; and displaying an authentication pattern based on one or more combinations of the transmissivity pattern, the first display pattern, and the second display pattern.

The method may include displaying at least one additional display pattern on at least one auxiliary transparent display panel, the auxiliary transparent display panel arranged to overlap the transparent display panel. The transparent display panel and the auxiliary transparent display panel may correspond to a transparent organic light emitting display panel, respectively. The transparent display panel and the auxiliary transparent display panel may correspond to a transparent liquid crystal display panel, respectively.

The authentication pattern may include at least one of a bar code pattern, a quick response code pattern, a character pattern, a number pattern, a figure pattern, or an image pattern. Authentication may be performed by checking whether the authentication pattern is consistent with an authentication reference pattern. The authentication reference pattern may be generated by adjusting at least one of a gray-level of the first display pattern or a gray-level of the second display pattern with respect to the transmissivity pattern.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
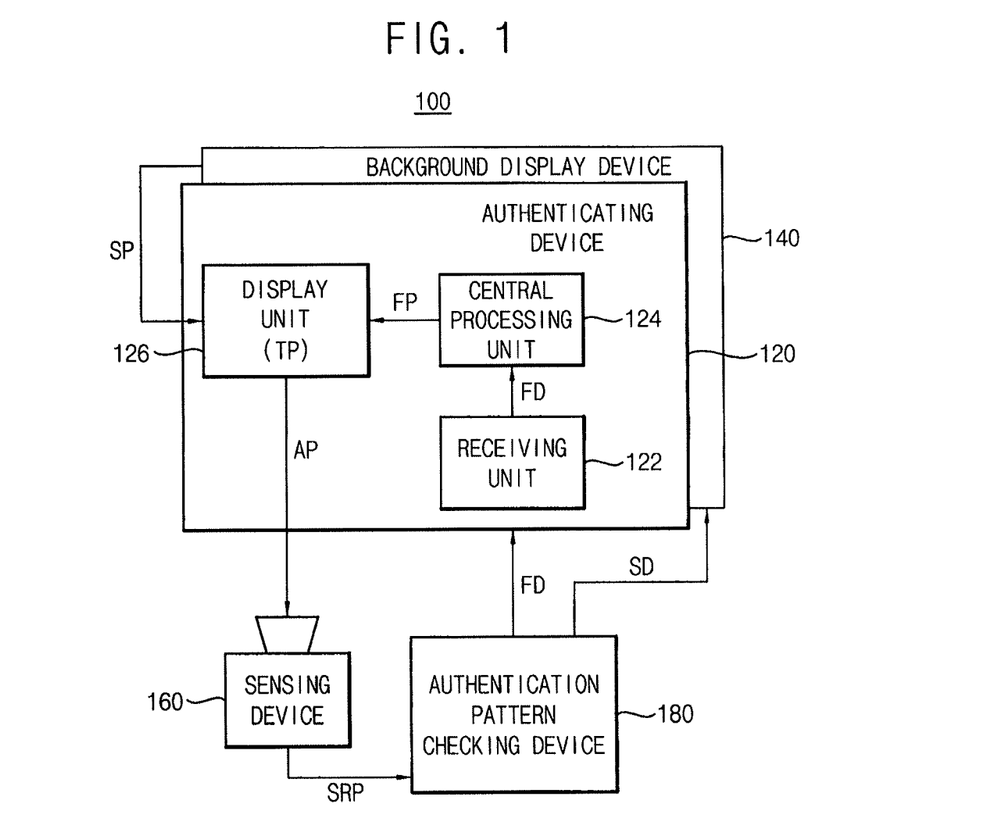
FIG. 1 illustrates one embodiment of an authenticating system.
Figure 2:
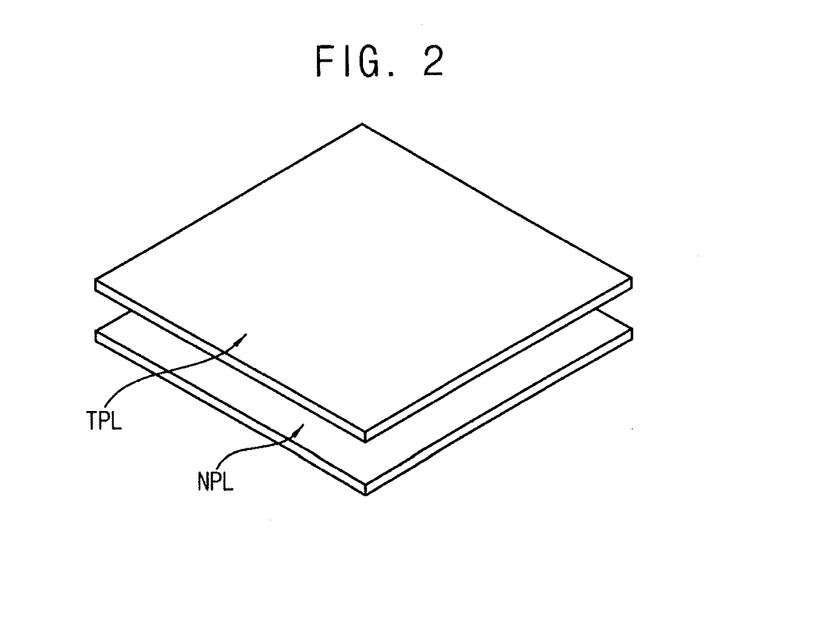
FIG. 2 illustrates an example of an overlapping relationship of a transparent organic light emitting display panel of an authenticating device and a display panel of a background display device overlap.
Figure 3:
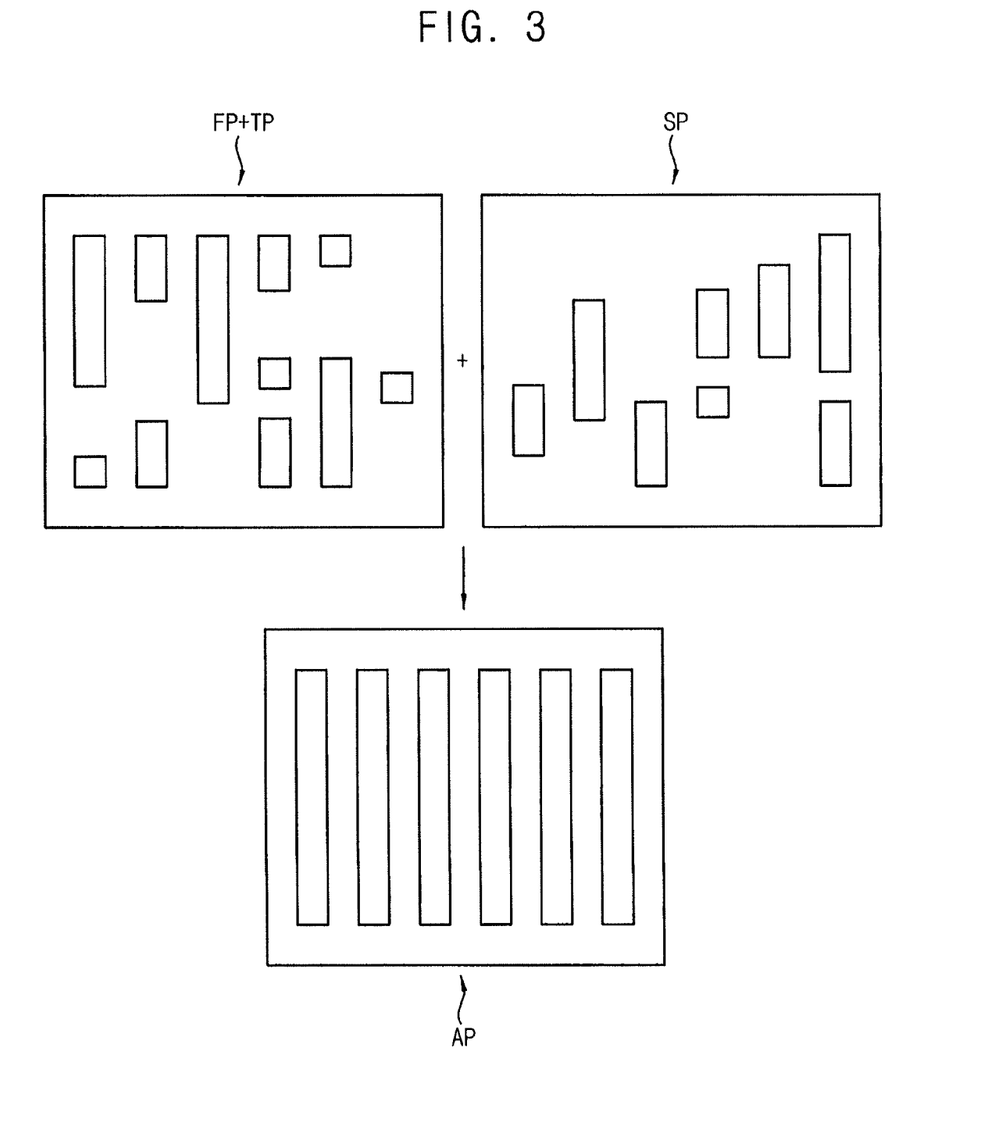
FIG. 3 illustrates an example of an authentication pattern.

FIG. 1 illustrates an embodiment of an authenticating system 100. FIG. 2 illustrates an example in which a transparent organic light emitting display panel of an authenticating device and a display panel of a background display device overlap in the authenticating system 100. FIG. 3 illustrates an example in which an authentication pattern is generated in the authenticating system 100.

Referring to FIGS. 1 through 3, the authenticating system 100 includes an authenticating device 120, a background display device 140, a sensing device 160, and an authentication pattern checking device 180. The authenticating system 100 performs an authentication operation based on interactions among the authenticating device 120, the background display device 140, the sensing device 160, and the authentication pattern checking device 180.

The authenticating device 120 may display a first display pattern FP on a transparent organic light emitting display panel TPL. The display panel TPL includes a transmissivity pattern TP which may be formed by differently (i.e., separately) setting a transmissivity of respective regions on the transparent organic light emitting display panel TPL.

For example, the authenticating device 120 may include a receiving unit 122, a central processing unit 124, and a display unit 126. The receiving unit 122 may receive first data FD related to an authentication reference pattern from the authentication pattern checking device 180. The first data may be received using wired and/or wireless communications link. The central processing unit 124 may process the first data FD to output a first display pattern FP to the display unit 126. The display unit 126 may include the transparent organic light emitting display panel TPL.

As illustrated in FIG. 1, when the authentication pattern checking device 180 provides the authenticating device 120 with the first data FD related to the authentication reference pattern, the authenticating device 120 may display the first display pattern FP corresponding to the first data FD on the transparent organic light emitting display panel TPL of the display unit 126. Because a window of the transparent organic light emitting display panel TPL includes a plurality of regions having different transmissivities, the transparent organic light emitting display panel TPL may include the transmissivity pattern TP.

The transmissivity pattern TP may be formed by differently setting the transmissivity of respective regions on the transparent organic light emitting display panel TPL. The transmissivity pattern TP may differ between or among a plurality of authenticating devices, and thus may act as an identifier of the authenticating device 120. In addition, an authentication pattern AP may be generated by combining the transmissivity pattern TP of the transparent organic light emitting display panel TPL of the authenticating device 120, the first display pattern FP displayed on the transparent organic light emitting display panel TPL of the authenticating device 120, and a second display pattern SP displayed on a display panel NPL of the background display device 140. Thus, a forgery of the authentication pattern AP may be prevented, even when the first display pattern FP and/or the second display pattern SP are leaked or otherwise become known to a hacker.

The background display device 140 may include the display panel NPL that displays the second display pattern SP. The display panel NPL of the background display device 140 may be arranged to overlap the transparent organic light emitting display panel TPL of the authenticating device 120. In one embodiment, as illustrated in FIG. 1, the background display device 140 may display the second display pattern SP corresponding to second data SD on the display panel NPL when the authentication pattern checking device 180 provides the background display device 140 with the second data SD related to the authentication reference pattern.

In another embodiment, the background display device 140 may display the second display pattern SP related to the authentication reference pattern on the display panel NPL when the authentication pattern checking device 180 provides the background display device 140 with an authentication start signal. For example, while the background display device 140 (e.g., an internal memory unit of the background display device 140) stores the second data SD corresponding to the second display pattern SP, the background display device 140 may display the second display pattern SP on the display panel NPL by reading the second data SD from the internal memory unit when the authentication start signal is received from the authentication pattern checking device 180.

In another embodiment, as illustrated in FIG. 2, when the authenticating device 120 is moved over the background display device 140 (e.g., when the transparent organic light emitting display panel TPL of the authenticating device 120 is arranged to overlap the display panel NPL of the background display device 140), interactions among the authenticating device 120, the background display device 140, the sensing device 160, and the authentication pattern checking device 180 may be performed. As a result, as illustrated in FIG. 3, the authentication pattern AP may be displayed (e.g., generated) based on combinations of the transmissivity pattern TP of the transparent organic light emitting display panel TPL in the authenticating device 120, the first display pattern FP displayed on the transparent organic light emitting display panel TPL in the authenticating device 120, and the second display pattern SP displayed on the display panel NPL in the background display device 140.

When the authentication pattern AP (e.g., a combined pattern of the transmissivity pattern TP of the transparent organic light emitting display panel TPL, the first display pattern FP displayed on the transparent organic light emitting display panel TPL, and the second display pattern SP displayed on the display panel NPL) is displayed, the sensing device 160 may sense the authentication pattern AP to generate a sensing pattern SRP. When the authentication pattern AP is displayed, a user may check with the naked eye whether the authentication pattern AP is consistent with the authentication reference pattern. However, because the authentication pattern AP is generated based on combinations of the transmissivity pattern TP of the transparent organic light emitting display panel TPL, the first display pattern FP displayed on the transparent organic light emitting display panel TPL, and the second display pattern SP displayed on the display panel NPL in the authenticating system 100, it may be difficult for the user to check with the naked eye whether the authentication pattern AP is consistent with the authentication reference pattern.

Therefore, when the sensing device 160 generates the sensing pattern SRP by sensing the authentication pattern AP, the authentication pattern checking device 180 may compare the sensing pattern SRP with the authentication reference pattern. However, the present embodiment may not allow the user to check with the naked eye whether the authentication pattern AP is consistent with the authentication reference pattern.

Subsequently, the authentication pattern checking device 180 may perform authentication by checking whether the sensing pattern SRP is consistent with the authentication reference pattern. For example, when the sensing pattern SRP is consistent with the authentication reference pattern, the authenticating system 100 may determine that a user carrying the authenticating device 120 has authority to access a system or place that requires security. On the other hand, when the sensing pattern SRP is not consistent with the authentication reference pattern, the authenticating system 100 may determine that a user carrying the authenticating device 120 does not have access authority to the system or place that requires security.

In one embodiment, the authentication pattern AP (i.e., the sensing pattern SRP) may include at least one of a bar code pattern, a quick response code pattern, a character pattern, a number pattern, a figure pattern, or an image pattern. For example, as illustrated in FIG. 3, the authentication pattern AP may be a figure pattern generated by alternately arranging rectangle blocks.

In one embodiment, when the authenticating device 120 is given to provide a user with access authority to a system or place that requires security, the authentication reference pattern may be preset based on the transmissivity pattern TP of the transparent organic light emitting display panel TPL in the authenticating device 120, the first display pattern FP to be displayed on the transparent organic light emitting display panel TPL in the authenticating device 120, and the second display pattern SP to be displayed on the display panel NPL in the background display device 140. The authentication reference pattern may be stored in the authentication pattern checking device 180.

The authentication reference pattern may be generated by adjusting at least one of a gray-level of the first display pattern FP or a gray-level of the second display pattern SP with respect to the transmissivity pattern TP. For example, a gray-level of the first display pattern FP and/or a gray-level of the second display pattern SP may be increased in a low-transmissivity region on the transparent organic light emitting display panel TPL. Additionally, or alternatively, a gray-level of the first display pattern FP and/or a gray-level of the second display pattern SP may be decreased in a high-transmissivity region on the transparent organic light emitting display panel TPL. Thus, a gray-level of the first display pattern FP and/or a gray-level of the second display pattern SP may be adjusted in various ways.

As previously described, the authenticating system 100 may perform the authentication by displaying the authentication pattern AP based on one or more combinations of the transmissivity pattern TP of the transparent organic light emitting display panel TPL in the authenticating device 120, the first display pattern FP displayed on the transparent organic light emitting display panel TPL the authenticating device 120, and the second display pattern SP displayed on the display panel NPL in the background display device 140. The authenticating system 100 may then compare the authentication pattern AP with the authentication reference pattern. As a result, the authenticating system 100 may perform improved security authentication at high speed.

In addition, the transparent organic light emitting display panel TPL of the authenticating device 120 may include the transmissivity pattern TP, which may be formed by differently setting transmissivity of respective regions on the transparent organic light emitting display panel TPL. The authentication pattern AP may be generated based on the transmissivity pattern TP that acts as an identifier of the authenticating device 120 (e.g., transmissivity pattern TP differs between authenticating devices). Thus, the authenticating system 100 may prevent the authentication pattern AP from being forged or illegitimately obtained, even when the first display pattern FP and/or the second display pattern SP are leaked by a hacker.

Further, the authenticating system 100 of the present embodiment may not require data synthesis for enhancing security. Thus, processing throughput of the central processing unit 124 of the authenticating device 120 may be reduced. Accordingly, the authenticating system 100 may operate at high speed.

Further, the authenticating device 120 of the authenticating system 100 may not include a memory unit (e.g., a memory device, a storage device, etc.) that stores specific data for performing the data synthesis. Thus, the authenticating system 100 may be manufactured at relatively low cost. In one embodiment, the authenticating device 120 and the background display device 140 may be in different electronic devices. In another embodiment, the authenticating device 120 and the background display device 140 may be included in one electronic device.

Figure 4:
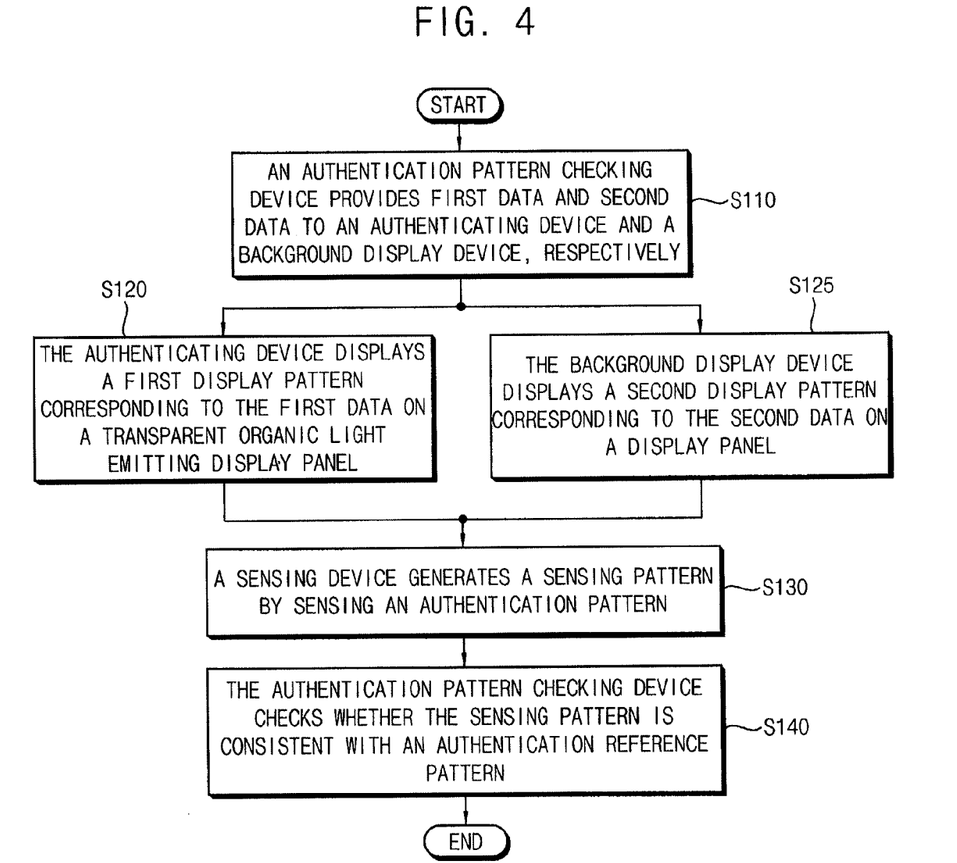
FIG. 4 illustrates an embodiment of a method for performing authentication.

FIG. 4 illustrates an embodiment of a method for performing authentication, which, for example, may be performed by the authenticating system of FIG. 1. In this method, the authenticating system 100 may perform authentication based on interactions among the authenticating device 120, the background display device 140, the sensing device 160, and the authentication pattern checking device 180. For example, when the authenticating device 120 is moved over the background display device 140 (e.g., when the transparent organic light emitting display panel TPL of the authenticating device 120 is arranged to overlap the display panel NPL of the background display device 140), the authentication pattern checking device 180 may provide the first data FD related to the authentication reference pattern and the second data SD related to the authentication reference pattern to the authenticating device 120 and the background display device 140, respectively (S110).

Subsequently, the authenticating device 120 may display the first display pattern FP corresponding to the first data FD on the transparent organic light emitting display panel TPL (S120). In addition, the background display device 140 may display the second display pattern SP corresponding to the second data SD on the display panel NPL (S125). As a result, the authentication pattern AP may be generated based on one or more combinations of the transmissivity pattern TP of the transparent organic light emitting display panel TPL, the first display pattern FP displayed on the transparent organic light emitting display panel TPL, and the second display pattern SP displayed on the display panel NPL.

Next, when the sensing device 160 generates the sensing pattern SRP by sensing the authentication pattern AP (S130), the authentication pattern checking device 180 checks whether the sensing pattern SRP is consistent with the authentication reference pattern (S140). In this way, the authentication may be performed in the authenticating system 100.

As described above, the authenticating system 100 may perform authentication by displaying the authentication pattern AP based on one or more combinations of the transmissivity pattern TP of the transparent organic light emitting display panel TPL included in the authenticating device 120, the first display pattern FP displayed on the transparent organic light emitting display panel TPL in the authenticating device 120, and the second display pattern SP displayed on the display panel NPL in the background display device 140. The authenticating system 100 may compare the authentication pattern AP with the authentication reference pattern. As a result, the authenticating system 100 may perform improved security authentication at high speed.

Figure 5:
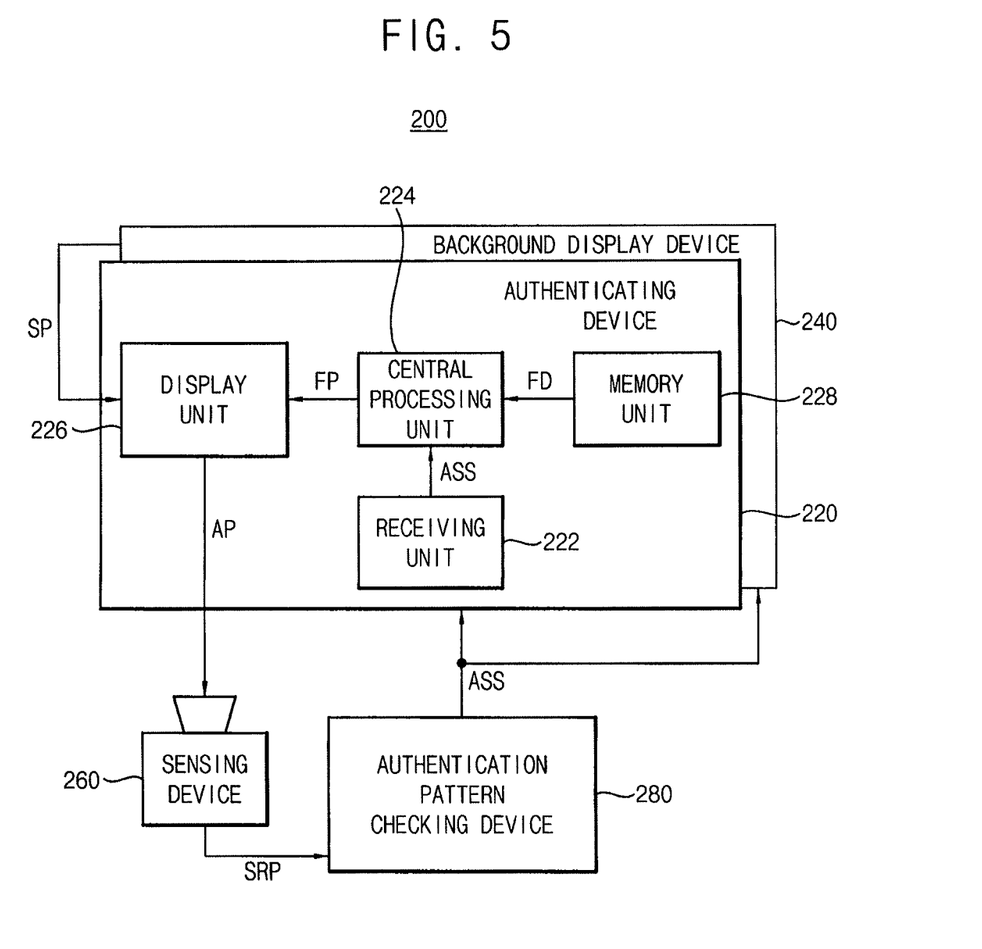
FIG. 5 illustrates another embodiment of an authenticating system.

FIG. 5 illustrates another embodiment of an authenticating system 200 which includes an authenticating device 220, a background display device 240, a sensing device 260, and an authentication pattern checking device 280. The authenticating system 200 may perform authentication based on interactions among the authenticating device 220, the background display device 240, the sensing device 260, and the authentication pattern checking device 280.

The authenticating device 220 may display a first display pattern FP on a transparent organic light emitting display panel including a transmissivity pattern TP. The transmissivity pattern TP may be formed by differently (e.g., separately) setting a transmissivity of respective regions on the transparent organic light emitting display panel.

The authenticating device 220 may include a receiving unit 222, a central processing unit 224, a display unit 226, and a memory unit 228. The receiving unit 222 may receive an authentication start signal ASS from the authentication pattern checking device 280 using wired and/or wireless communications.

The central processing unit 224 may process first data FD corresponding to the first display pattern FP to output the first display pattern FP to the display unit 226.

The display unit 226 may include the transparent organic light emitting display panel. The memory unit 228 may store the first data FD. For example, the memory unit 220 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, or a mobile dynamic random access memory (mobile DRAM) device. The memory unit 228 may further include a solid state drive (SSD) device, a hard disk drive (HDD) device, etc.

As illustrated in FIG. 5, when the authentication pattern checking device 280 provides the authenticating device 220 with the authentication start signal ASS, the authenticating device 220 may display the first display pattern FP related to the authentication reference pattern on the transparent organic light emitting display panel of the display unit 226 in response to the authentication start signal ASS. For example, while the authenticating device 220 stores the first data FD corresponding to the first display pattern FP (e.g., in the memory unit 228), the authenticating device 220 may display the first display pattern FP on the transparent organic light emitting display panel by reading the first data FD from the memory unit 228 when the authentication start signal ASS is received from the authentication pattern checking device 280.

Because a window of the transparent organic light emitting display panel includes a plurality of regions having different transmissivities, the transparent organic light emitting display panel may include the transmissivity pattern TP, where the transmissivity pattern TP is formed by differently setting the transmissivity of respective regions on the transparent organic light emitting display panel. The transmissivity pattern TP may differ between a plurality of authenticating devices, and thus may act as an identifier of the authenticating device 220.

In addition, an authentication pattern AP may be generated by combining the transmissivity pattern TP of the transparent organic light emitting display panel of the authenticating device 220, the first display pattern FP displayed on the transparent organic light emitting display panel of the authenticating device 220, and a second display pattern SP displayed on a display panel of the background display device 240. Thus, a forgery of the authentication pattern AP may be prevented, even when the first display pattern FP and/or the second display pattern SP are leaked by a hacker.

The background display device 240 may include the display panel that displays the second display pattern SP. The display panel of the background display device 240 may be arranged to overlap the transparent organic light emitting display panel of the authenticating device 220. In one embodiment, as illustrated in FIG. 5, the background display device 240 may display the second display pattern SP related to the authentication reference pattern on the display panel when the authentication pattern checking device 280 provides the background display device 240 with the authentication start signal ASS. For example, while the background display device 240 (e.g., an internal memory unit of the background display device 240) stores the second data SD corresponding to the second display pattern SP, the background display device 240 may display the second display pattern SP on the display panel by reading the second data SD from the internal memory unit when the authentication start signal ASS is received from the authentication pattern checking device 280.

In another embodiment, the background display device 240 may display the second display pattern SP corresponding to the second data SD on the display panel when the authentication pattern checking device 280 provides the background display device 240 with the second data SD related to the authentication reference pattern. In this case, the background display device 240 may not include the internal memory unit.

In one embodiment, when the authenticating device 220 is moved over the background display device 240 (e.g., when the transparent organic light emitting display panel of the authenticating device 220 is arranged to overlap the display panel of the background display device 240), interactions among the authenticating device 220, the background display device 240, the sensing device 260, and the authentication pattern checking device 280 may be performed. As a result, the authentication pattern AP may be displayed (e.g., generated) based on one or more combinations of the transmissivity pattern TP of the transparent organic light emitting display panel in the authenticating device 220, the first display pattern FP displayed on the transparent organic light emitting display panel the authenticating device 220, and the second display pattern SP displayed on the display panel in the background display device 240.

When the authentication pattern AP (e.g., a combined pattern of the transmissivity pattern TP of the transparent organic light emitting display panel, the first display pattern FP displayed on the transparent organic light emitting display panel, and the second display pattern SP displayed on the display panel) is displayed, the sensing device 260 may sense the authentication pattern AP to generate a sensing pattern SRP.

When the authentication pattern AP is displayed, a user may check with the naked eye whether the authentication pattern AP is consistent with the authentication reference pattern. However, because the authentication pattern AP is generated based on one or more combinations of the transmissivity pattern TP of the transparent organic light emitting display panel, the first display pattern FP displayed on the transparent organic light emitting display panel, and the second display pattern SP displayed on the display panel in the authenticating system 200, in some circumstances, it may be difficult for the user to check with the naked eye whether the authentication pattern AP is consistent with the authentication reference pattern.

Therefore, when the sensing device 260 generates the sensing pattern SRP by sensing the authentication pattern AP, the authentication pattern checking device 280 may compare the sensing pattern SRP with the authentication reference pattern. However, in another embodiment, the user may check with the naked eye whether the authentication pattern AP is consistent with the authentication reference pattern.

Subsequently, the authentication pattern checking device 280 may perform authentication by checking whether the sensing pattern SRP is consistent with the authentication reference pattern. For example, when the sensing pattern SRP is consistent with the authentication reference pattern, the authenticating system 200 may determine that a user carrying the authenticating device 220 has authority for accessing a system or a place that requires security. On the other hand, when the sensing pattern SRP is not consistent with the authentication reference pattern, the authenticating system 200 may determine that a user carrying the authenticating device 220 does not have access authority to the system or place that requires security.

In one embodiment, the authentication pattern AP (e.g., the sensing pattern SRP) may include at least one of a bar code pattern, a quick response code pattern, a character pattern, a number pattern, a figure pattern, or an image pattern.

In one embodiment, when the authenticating device 220 is given to provide a user with access authority to a system or place that requires security, the authentication reference pattern may be preset based on the transmissivity pattern TP of the transparent organic light emitting display panel in the authenticating device 220, the first display pattern FP that is to be displayed on the transparent organic light emitting display panel in the authenticating device 220, and the second display pattern SP that is to be displayed on the display panel in the background display device 240 The authentication reference pattern may be stored in the authentication pattern checking device 280.

The authentication reference pattern may be generated by adjusting at least one of a gray-level of the first display pattern FP or a gray-level of the second display pattern SP with respect to the transmissivity pattern TP. For example, a gray-level of the first display pattern FP and/or a gray-level of the second display pattern SP may be increased in a low-transmissivity region on the transparent organic light emitting display panel. Additionally, or alternatively, a gray-level of the first display pattern FP and/or a gray-level of the second display pattern SP may be decreased in a high-transmissivity region on the transparent organic light emitting display panel. Thus, a gray-level of the first display pattern FP and/or a gray-level of the second display pattern SP may be adjusted in various ways.

As previously described, the authenticating system 200 may perform authentication by displaying the authentication pattern AP based on one or more combinations of the transmissivity pattern TP of the transparent organic light emitting display panel in the authenticating device 220, the first display pattern FP displayed on the transparent organic light emitting display panel in the authenticating device 220, and the second display pattern SP displayed on the display panel in the background display device 240. The authenticating system 200 may then compare the authentication pattern AP with the authentication reference pattern. As a result, the authenticating system 200 may perform improved security authentication at high speed.

In addition, the transparent organic light emitting display panel of the authenticating device 220 may include the transmissivity pattern TP formed by differently setting a transmissivity of respective regions on the transparent organic light emitting display panel. The authentication pattern AP may be generated based on the transmissivity pattern TP, that acts as an identifier of the authenticating device 220 (e.g., the transmissivity pattern TP differs between authenticating devices). Thus, the authenticating system 200 may prevent the authentication pattern AP from being forged, even when the first display pattern FP and/or the second display pattern SP are leaked by a hacker.

Further, in accordance with one embodiment, the authenticating system 200 may not require data synthesis for enhancing security. Thus, processing throughput by the central processing unit 224 of the authenticating device 220 may be reduced. Accordingly, the authenticating system 200 may operate at high speed.

In one embodiment, the authenticating device 220 and the background display device 240 may be in different electronic devices. In another embodiment, the authenticating device 220 and the background display device 240 may be in the same electronic device.

Figure 6:
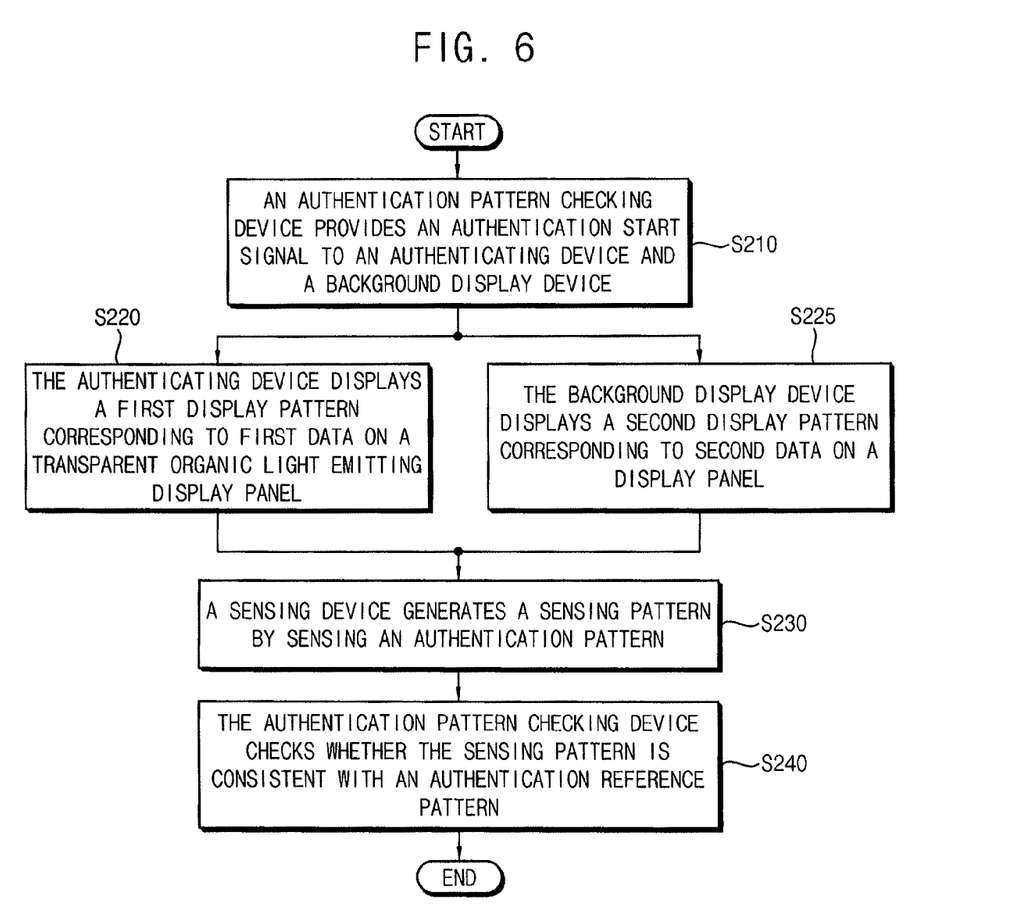
FIG. 6 illustrates another embodiment of a method for performing authentication.

FIG. 6 illustrates another embodiment of a method for performing authentication, which, for example, may be performed by the authenticating system of FIG. 5. In FIG. 6, the authenticating system 200 performs authentication based on interactions among the authenticating device 220, the background display device 240, the sensing device 260, and the authentication pattern checking device 280.

When the authenticating device 220 is moved over the background display device 240 (e.g., when the transparent organic light emitting display panel of the authenticating device 220 is arranged to overlap the display panel of the background display device 240), the authentication pattern checking device 280 may provide the authentication start signal ASS to the authenticating device 220 and the background display device 240 (S210).

In one embodiment, the authentication pattern checking device 280 may provide the authentication start signal ASS to the authenticating device 220 and the background display device 240 at the same time. In another embodiment, the authentication pattern checking device 280 may provide the authentication start signal ASS to the authenticating device 220, and then may provide the authentication start signal ASS to the background display device 240. In another embodiment, the authentication pattern checking device 280 may provide the authentication start signal ASS to the background display device 240, and then may provide the authentication start signal ASS to the authenticating device 220.

Subsequently, the authenticating device 220 may display the first display pattern FP, corresponding to the first data FD on the transparent organic light emitting display panel, by reading the first data FD from the memory unit 228 (S220). The background display device 240 may display the second display pattern SP, corresponding to the second data SD on the display panel, by reading the second data SD from the internal memory unit (S225). As a result, the authentication pattern AP may be generated based on one or more combinations of the transmissivity pattern TP of the transparent organic light emitting display panel in the authenticating device 220, the first display pattern FP displayed on the transparent organic light emitting display panel in the authenticating device 220, and the second display pattern SP displayed on the display panel in the background display device 240.

Next, when the sensing device 260 generates the sensing pattern SRP by sensing the authentication pattern AP (S230), the authentication pattern checking device 280 may check whether the sensing pattern SRP is consistent with the authentication reference pattern (S240). In this way, authentication may be performed in the authenticating system 200.

As previously described, the authenticating system 200 may perform authentication by displaying the authentication pattern AP based on one or more combinations of the transmissivity pattern TP of the transparent organic light emitting display panel in the authenticating device 220, the first display pattern FP displayed on the transparent organic light emitting display panel in the authenticating device 220, and the second display pattern SP displayed on the display panel in the background display device 240. The authenticating system 200 may compare the authentication pattern AP with the authentication reference pattern. As a result, the authenticating system 200 may perform improved security authentication at high speed.

Figure 7:
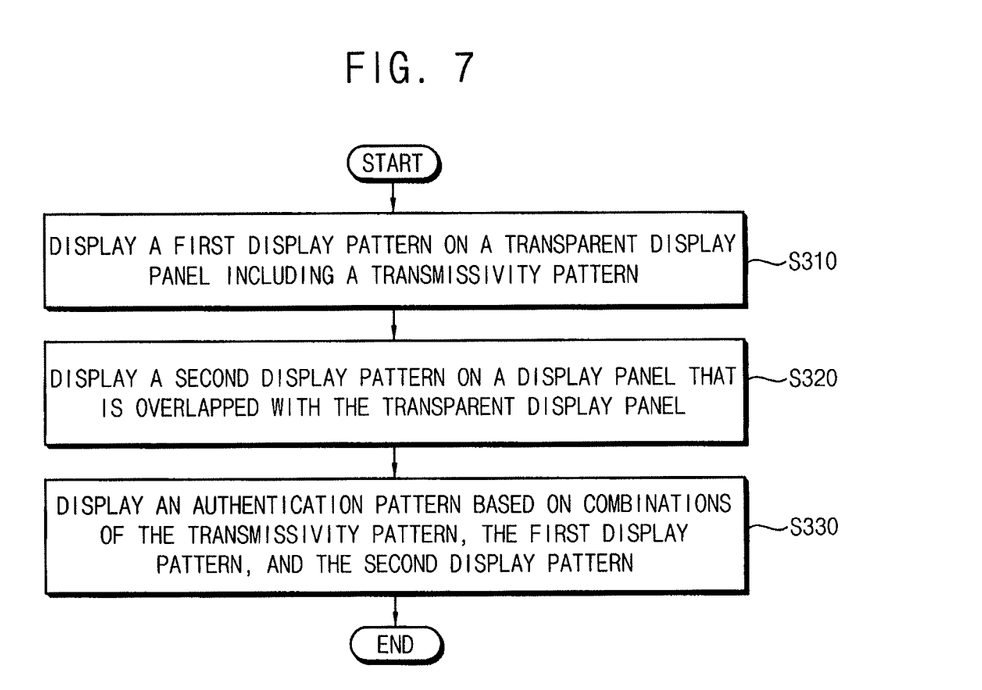
FIG. 7 illustrates an embodiment of a method for generating authentication patterns.
Figure 8:
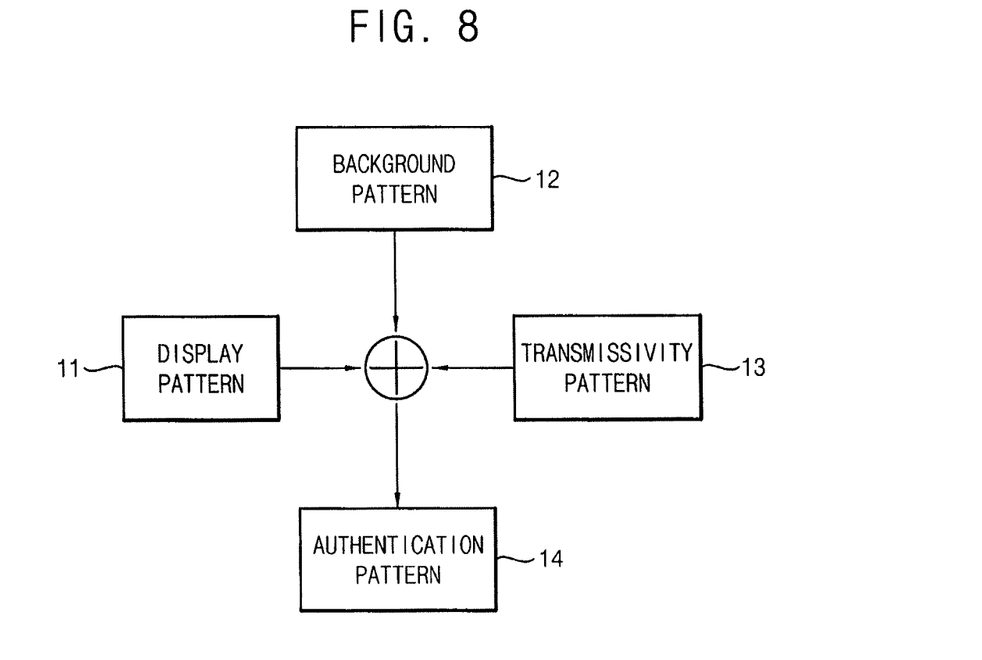
FIG. 8 illustrates an example of how an authentication pattern may be generated by the method of FIG. 7.

FIG. 7 illustrates an embodiment of a method for generating authentication patterns. FIG. 8 illustrates an example of how an authentication pattern may be generated by the method of FIG. 7.

Referring to FIGS. 7 and 8, the method includes displaying a first display pattern 11 on a transparent display panel including a transmissivity pattern 13 (S310). The transmissivity pattern 13 is formed by differently (e.g., separately) setting transmissivity of respective regions on the transparent display panel. A second display pattern 12 is displayed on a display panel that is arranged to overlap the transparent display panel (S320). An authentication pattern 14 is displayed based on one or more combinations of the transmissivity pattern 13, the first display pattern 11, and the second display pattern 12 (S330). In other words, the authentication pattern 14 may be generated by combining the transmissivity pattern 13, the first display pattern 11, and the second display pattern 12. Although FIG. 7 illustrates that the second display pattern 12 is displayed on the display panel after the first display pattern 11 is displayed on the transparent display panel, first display pattern 11 may be displayed on the transparent display panel after the second display pattern 12 is displayed on the display panel.

In one embodiment, the transparent display panel may correspond to a transparent organic light emitting display panel. In another example embodiment, the transparent display panel may correspond to a transparent liquid crystal display panel. Thus, because the display panel is visible through the transparent display panel, the first display pattern 11 displayed on the transparent display panel may overlap with the second display pattern 12 displayed on the display panel.

In addition, because the transparent display panel includes a transmissivity pattern 13 that is formed by differently setting a transmissivity of respective regions on the transparent display panel (e.g., because a window of the transparent display panel includes a plurality of regions having different transmissivities), the authentication pattern 14 may be displayed as a combined pattern of the transmissivity pattern 13 of the transparent display panel, the first display pattern 11 displayed on the transparent display panel, and the second display pattern 12 displayed on the display panel.

In one embodiment, the method of FIG. 7 may display at least one additional display pattern on at least one auxiliary transparent display panel. The auxiliary transparent display panel may be arranged to be overlap the transparent display panel. In this case, the authentication pattern 14 may be generated by combining the transmissivity pattern 13 of the transparent display panel, the first display pattern 11 displayed on the transparent display panel, the second display pattern 12 displayed on the display panel, and the additional display pattern displayed on the auxiliary transparent display panel. Thus, the security of the authentication pattern 14 may be improved.

In one embodiment, the authentication pattern AP may include at least one of a bar code pattern, a quick response code pattern, a character pattern, a number pattern, a figure pattern, or an image pattern. The authentication may be performed by checking whether the authentication pattern 14 is consistent with a predetermined authentication reference pattern.

In one embodiment, the authentication reference pattern may be generated by adjusting at least one of a gray-level of the first display pattern 11 or a gray-level of the second display pattern 12 with respect to the transmissivity pattern 13 of the transparent display panel.

Because the method of FIG. 7 may generate the authentication pattern 14 based on one or more combinations of the transmissivity pattern 13 of the transparent display panel, the first display pattern 11 displayed on the transparent display panel, and the second display pattern 12 displayed on the display panel, this method may prevent the authentication pattern 14 from being forged even when the first display pattern 11 and/or the second display pattern 12 are leaked by a hacker. Therefore, this method may be employed in an authenticating system that requires improved security and high-speed operation.

Figure 9:
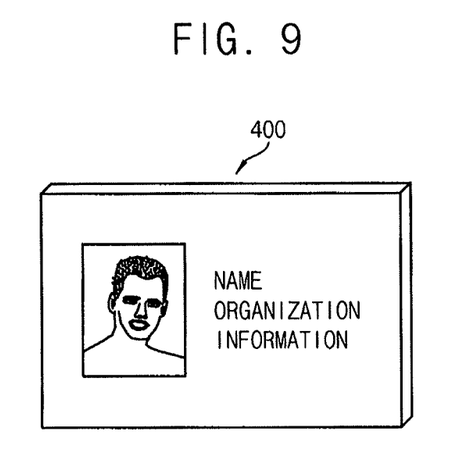
FIG. 9 illustrates an embodiment of an electronic device.
Figure 10:
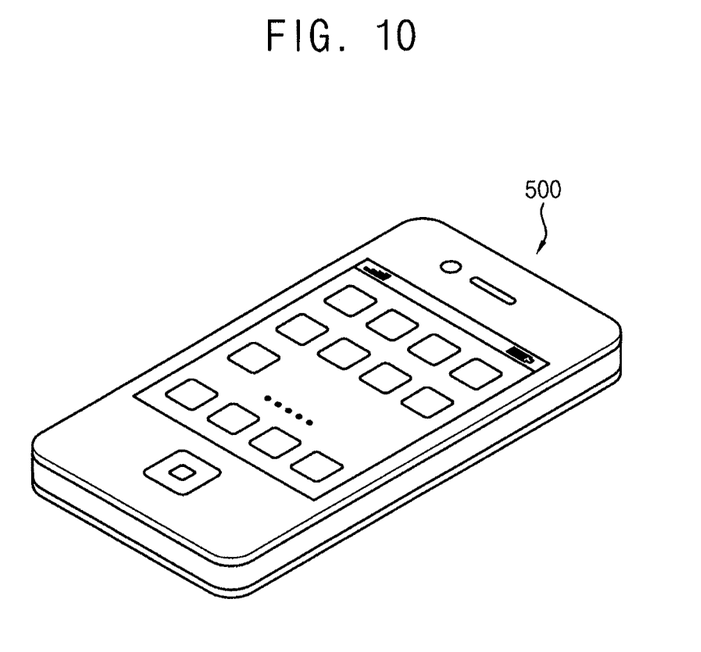
FIG. 10 illustrates another embodiment of an electronic device.

FIG. 9 illustrates an embodiment of an electronic device that performs the method of FIG. 7. FIG. 10 illustrates another embodiment of an electronic device that performs this method. In FIG. 9, the electronic device is or is included in a smart card 400 illustrated in FIG. 9. In FIG. 10, the electronic device is or is included in a smart phone 500.

In these embodiments, the method may be performed by an authenticating system which includes an authenticating device, a background display device, a sensing device, and an authentication pattern checking device.

The authenticating device may display a first display pattern on a transparent display panel including a transmissivity pattern, where the transmissivity pattern is formed by differently (e.g., separately) setting a transmissivity of respective regions on the transparent display panel.

The background display device may display a second display pattern on a display panel, where the display panel is arranged to overlap the transparent display panel.

The sensing device may generate a sensing pattern by sensing an authentication pattern, where the authentication pattern is generated based on one or more combinations of the transmissivity pattern, the first display pattern, and the second display pattern.

The authentication pattern checking device may check whether the sensing pattern is consistent with an authentication reference pattern. In this way, authentication may be performed in the authenticating system. In one embodiment, the authenticating device and the background display device may be in different electronic devices. In this case, as illustrated in FIG. 9, the authenticating device may be in the smart card 400 (e.g., an electronic passport, an electronic identification card, etc.), and the background display device may be included in a specific electronic device (e.g., a television, etc.).

In one example, authentication may be performed when the smart card 400 is moved over the television (e.g., the transparent display panel of the smart card 400 is arranged to overlap the display panel of the television).

In another example, the authenticating device and the background display device may be included in the same electronic device. In this case, as illustrated in FIG. 10, the transparent display panel of the authenticating device may be arranged to overlap the display panel of the background display device in the smart phone 500. Thus, for example, authentication may be performed when a specific button of the smart phone 500 (e.g., a physical button, a touch-screen button, etc.) is pushed by a user.

In one embodiment, a transparent display panel corresponds to a transparent organic light emitting display panel. In other embodiments, the transparent display panel may correspond to one of various transparent display panels such as a transparent liquid crystal display panel, etc.

The aforementioned embodiments may be applied, for example, to a television, a computer, a laptop, a digital camera, a cellular phone, a smart phone, a smart pad, a tablet PC, a personal digital assistant (PDA), a portable multimedia player (PMP), an MP3 player, a navigation system, a camcorder, a video phone, etc.

By way of summation and review, when a user tries to access a system or a place that requires security, an authenticating system may determine whether the specific user has authority to access the system or the place that requires security. In one type of authenticating system that has been proposed, a sensing device senses an authentication pattern from an authenticating device carried by a user, Then, an authentication pattern checking device checks whether the sensed authentication pattern is consistent with an authentication reference pattern. However, in this system, the authentication pattern is stored in the authenticating device. Consequently, the authentication pattern may be forged when the authenticating device is hacked by a hacker.

In accordance with one or more of the aforementioned embodiments, authentication is performed by displaying an authentication pattern based on one or more combinations of a transmissivity pattern of a transparent display panel in an authenticating device, a first display pattern displayed on the transparent display panel, and a second display pattern displayed on a display panel in a background display device. The authentication pattern is compared with an authentication reference pattern. The transmissivity pattern is formed by differently (e.g., separately) setting transmissivity of respective regions on the transparent display panel. Thus, the transmissivity pattern may act as an identifier of the authenticating device and improved security authentication may be performed at high speed.

The methods and processes described herein may be performed by code or instructions to be executed by a computer, processor, or controller. Because the algorithms that form the basis of the methods (or operations of the computer, processor, or controller) are described in detail, the code or instructions for implementing the operations of the method embodiments may transform the computer, processor, or controller into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, or controller which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. An authenticating system, comprising:
an authenticating device including a display to display a first display pattern on a transparent display panel including a transmissivity pattern, the transmissivity pattern including a plurality of regions with different transmissivities that form a pattern that serves as a unique identifier of the authenticating device as an authorized device;

a background display to display a second display pattern on a display panel, the display panel to overlap the transparent display panel;

a sensor to generate a sensing pattern by sensing an authentication pattern generated based on the transmissivity pattern, the first display pattern, and the second display pattern; and an analyzer to perform authentication by checking whether the sensing pattern is consistent with an authentication reference pattern.

2. The system as claimed in claim 1, wherein the authentication pattern includes at least one of a bar code pattern, a quick response code pattern, a character pattern, a number pattern, a figure pattern, or an image pattern.

3. The system as claimed in claim 1, wherein:
the authentication reference pattern is preset based on the transmissivity pattern, the first display pattern, and the second display pattern, and
the authentication reference pattern is stored in the analyzer.

4. The system as claimed in claim 3, wherein the authentication reference pattern is generated by adjusting at least one of a gray-level of the first display pattern or a gray-level of the second display pattern with respect to the transmissivity pattern.

5. The system as claimed in claim 1, wherein interactions among the authenticating device, the background display, the sensor, and the analyzer occur when the transparent display panel of the authenticating device is moved over the display panel of the background display.

6. The system as claimed in claim 5, wherein:
the analyzer provides the authenticating device with first data related to the authentication reference pattern, and
the authenticating device displays the first display pattern corresponding to the first data on the transparent display panel.

7. The system as claimed in claim 6, wherein the authenticating device includes:
a receiver to receive the first data from the analyzer; and
a processor to process the first data to output the first display pattern to the display.

8. The system as claimed in claim 5, wherein:
the analyzer provides the authenticating device with an authentication start signal, and
the display of the authenticating device displays the first display pattern related to the authentication reference pattern on the transparent display panel in response to the authentication start signal.

9. The system as claimed in claim 8, wherein the authenticating device includes:
a receiver to receive the authentication start signal from the authentication pattern checking device;
a memory to store first data corresponding to the first display pattern; and
a processor to process the first data to output the first display pattern to the display.

10. The system as claimed in claim 5, wherein:
the analyzer provides the background display device with second data related to the authentication reference pattern, and
the background display displays the second display pattern corresponding to the second data on the display panel.

11. The system as claimed in claim 5, wherein:
the analyzer provides the background display device with an authentication start signal, and
the background display displays the second display pattern related to the authentication reference pattern on the display panel.

12. The system as claimed in claim 5, wherein the analyzer and the background display are in different electronic devices.

13. The system as claimed in claim 5, wherein the analyzer and the background display are in a same electronic device.

14. A method of generating authentication patterns, comprising:
displaying a first display pattern on a transparent display panel including a transmissivity pattern, the transmissivity pattern formed by setting transmissivity of respective regions differently on the transparent display panel in a pattern that serves as a unique identifier of the transparent display panel as an authorized device;
displaying a second display pattern on a display panel arranged to overlap the transparent display panel; and
displaying an authentication pattern based on one or more combinations of the transmissivity pattern, the first display pattern, and the second display pattern; and
performing authentication by checking whether the authentication pattern is consistent with an authentication reference pattern.

15. The method as claimed in claim 14, further comprising:
displaying at least one additional display pattern on at least one auxiliary transparent display panel, the auxiliary transparent display panel arranged to overlap the transparent display panel.

16. The method as claimed in claim 15, wherein the transparent display panel and the auxiliary transparent display panel correspond to a transparent organic light emitting display panel, respectively.

17. The method as claimed in claim 15, wherein the transparent display panel and the auxiliary transparent display panel correspond to a transparent liquid crystal display panel, respectively.

18. The method as claimed in claim 14, wherein the authentication pattern includes at least one of a bar code pattern, a quick response code pattern, a character pattern, a number pattern, a figure pattern, or an image pattern.

19. The method as claimed in claim 17, wherein the authentication reference pattern is generated by adjusting at least one of a gray-level of the first display pattern or a gray-level of the second display pattern with respect to the transmissivity pattern.

* * * * *